(12) United States Patent
Ghyvoronsky

(10) Patent No.: US 9,802,522 B2
(45) Date of Patent: Oct. 31, 2017

(54) VEHICLE BEVERAGE HOLDER

(71) Applicant: Maksim Ghyvoronsky, Bothell, WA (US)

(72) Inventor: Maksim Ghyvoronsky, Bothell, WA (US)

(*) Notice: Subject to any disclaimer, the term of this patent is extended or adjusted under 35 U.S.C. 154(b) by 42 days.

(21) Appl. No.: 14/644,539

(22) Filed: Mar. 11, 2015

(65) Prior Publication Data
US 2015/0314718 A1 Nov. 5, 2015

Related U.S. Application Data

(63) Continuation-in-part of application No. PCT/US2014/036852, filed on May 5, 2014.

(60) Provisional application No. 61/819,271, filed on May 3, 2013.

(51) Int. Cl.
*B60N 3/10* (2006.01)

(52) U.S. Cl.
CPC .............. *B60N 3/10* (2013.01); *B60N 3/101* (2013.01); *B60N 3/103* (2013.01); *B60N 3/106* (2013.01)

(58) Field of Classification Search
CPC ......... B60N 3/106; B60N 3/103; B60N 3/101
USPC ................................. 296/37.8, 37.1
See application file for complete search history.

(56) References Cited

U.S. PATENT DOCUMENTS

| 431,036 A | 7/1890 | Dawson |
| 538,534 A | 4/1895 | O.Neill |
| 2,601,767 A | 7/1952 | Wall |
| 2,950,836 A | 8/1960 | Murdock |
| 3,185,341 A | 5/1965 | Barbour |
| 3,341,062 A | 9/1967 | Phillips |
| 4,726,487 A | 2/1988 | Mitri |
| 5,094,415 A | 3/1992 | Revette et al. |
| 5,174,534 A | 12/1992 | Mitchell |
| 5,238,211 A | 8/1993 | Borovski |
| 5,769,369 A | 6/1998 | Meinel |
| 5,857,601 A | 1/1999 | Greenwood |
| 6,543,637 B1 | 4/2003 | Osborn |
| 7,328,876 B2 | 2/2008 | Jones |
| 7,597,300 B2 * | 10/2009 | Harada ............. A47G 23/0225 220/282 |
| 7,748,678 B2 | 7/2010 | Camarota et al. |

(Continued)

FOREIGN PATENT DOCUMENTS

DE          10217157 A1 * 11/2003 ............. B60N 3/102

*Primary Examiner* — Pinel Romain
(74) *Attorney, Agent, or Firm* — Dean A Craine

(57) ABSTRACT

A holder for a vehicle that temporarily holds and continuously adjusts the orientation of a beverage container filled with a liquid that prevents spills as the vehicle is moving. The holder includes a base with an upper hole with a smooth perimeter edge and a suspended beverage container vessel that fits into the upper hole and rests against the perimeter edge. The container vessel includes a downward extending, half-spherical upper member and a lower neck. Formed inside the container vessel is a center bore that receives a complimentary shaped beverage container. The upper member and the perimeter edge on the base are configured to form a gripping space between the beverage container and the upper member. When the lower neck is placed inside the upper hole, the base's perimeter edge supports the upper member and allows the vessel to swivel freely when a beverage container is placed in the vessel.

14 Claims, 20 Drawing Sheets

(56) References Cited

U.S. PATENT DOCUMENTS

| | | |
|---|---|---|
| 8,348,110 B1 | 1/2013 | Whynot et al. |
| 2001/0017339 A1 | 8/2001 | Brotz et al. |
| 2004/0129747 A1* | 7/2004 | Maierholzner ........ B60N 3/102 224/544 |
| 2005/0056759 A1 | 3/2005 | Tiller |
| 2006/0278790 A1 | 12/2006 | Park |
| 2007/0090256 A1 | 4/2007 | Hansen et al. |
| 2008/0017764 A1 | 1/2008 | Nan |
| 2013/0038097 A1* | 2/2013 | Oldani .................... B60N 3/102 297/188.14 |
| 2014/0158848 A1* | 6/2014 | Caruso .................. B60N 3/106 248/311.2 |
| 2015/0291090 A1* | 10/2015 | Koizumi ................ B60N 3/101 362/511 |
| 2015/0367765 A1* | 12/2015 | Kupina .................. B60N 3/101 211/85.4 |
| 2017/0029006 A1* | 2/2017 | Kim ......................... B62B 9/26 |

* cited by examiner

VEHICLE BEVERAGE HOLDER

This is a continuation in part patent application of PCT patent application (Application No. PCT/US2014/036852)) filed on May 5, 2014 which is based on and claims the filing date benefit of U.S. Provisional patent (Application No. 61/819,271) filed on May 3, 2013.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to holders for beverage containers in motor vehicles that temporarily hold and automatically adjusts the position of a beverage container while the motor vehicle is driven and also allows the beverage container to be easily gripped and removed from the holder.

2. Description of the Related Art

Today, drivers and passengers spend a large amount of time in their motor vehicles. They often consume beverages from cylindrical beverage containers. The beverage containers are usually placed in fixed cup holders in a center console between the two front or rear seats. While most beverage containers have lids, the liquids inside the beverage container sloshes from side-to-side as the motor vehicle is driven the beverage. If the lid is misaligned and not properly attached to the container, the liquid may leak around the edge of container and lid or spill through the mouth opening formed in the lid.

The size of cup holders in motor vehicles are standardized and intended to be used with cylindrical beverage containers 7 to 9 inches in height, 2 to 3 inches in diameter. They typically hold 12 to 16 fluid ounces. Many convenient stores sell larger beverage container 24 to 32 fluid ounces that do not fit into the motor vehicle's cup holders. When larger containers are used that do not fit into the cup holder, the drivers and passengers temporarily must place them on a flat surface on the center console, place them between their legs, or continuous hold them in one hand. For drivers of motor vehicles with manual transmissions, trying to shift gears and hold a beverage container upright without spilling the beverage is difficult.

Hot beverages are often sold in different size paper cups with plastic lids. The plastic lids usually include an outer circular gutter that snap fits over the cup's top edge. When a short cup is placed in a cup holder, often only the plastic lid is exposed and becomes the gripping surface to remove the paper cup from the holder. Because the user must squeeze the sides of the plastic lid to lift the paper cup from the holder, the lids often disengage from the cup causing burns.

SUMMARY OF THE INVENTION

Disclosed is a beverage holder designed for the center console area in a vehicle between the passenger seats. The beverage holder is designed to temporarily hold a cylindrical shaped beverage container filled with a consumable liquid that automatically and continuously adjusts the orientation of the beverage container to prevent spills as the vehicle is moving. The beverage holder accommodates different sizes of beverage containers, and allows the user to adjust the depth of the holder to position the beverage container at a suitable height when placed in the beverage holder so it may be easily grasped. The beverage holder may be easily adjusted to hold a large container that holds up to 64 fluid oz.

In the first embodiment, the holder includes a hollow base with at least one upper hole with a thin, low contact, low friction perimeter edge. Inserted into the upper hole is a removable container vessel. The container vessel includes a half-spherical upper member that extends above the top surface of the base. The lower portion of the upper member rests against the upper hole's perimeter edge. The container vessel also includes a lower neck that extends through the upper hole and into the wide cavity formed inside the base.

The upper member is made of low friction plastic or nylon that allows the upper member to rotate freely in 360 degrees over the perimeter edge of the upper hole. The diameter and side walls of the upper member are larger than the diameter of the upper hole so the lower portion of the upper member extends slightly below the hole and the upper portion of the upper member extends above the upper hole. When the container vessel is longitudinally aligned over the upper hole, the upper member's transverse mid line axis is substantially aligned with the perimeter edge of the hole. The base is configured so the cavity is sufficiently large to allow the lower neck of the container vessel to swing freely side-to-side inside the base.

The lower neck of the container vessel is cylindrical with a closed lower end. The lower neck's side walls are straight and vertically or slightly aligned in a slightly downward converging angle. The length of the lower neck of the container vessel is substantially greater than the height of the upper portion. In the preferred embodiment, the length of the lower neck is sufficient so that at least 51% of the container is located below the mid-line axis of the upper member.

The lower neck of the container vessel includes a cylindrical center bore designed to receive a complimentary shaped beverage container. Because the upper portion of the upper member is larger in diameter than the center bore, when a straight walled beverage container is placed into the center bore, a gap is created between the inside surface of the exposed upper portion and the upper side walls of the beverage container that allows the user to easily grasp the beverage container.

When the lower neck of the container vessel is placed through the upper hole on the base and into the cavity, the upper member of the container vessel is supported by the perimeter edge of the upper hole. Because the perimeter edge and the upper member are thin, they have minimal contact surfaces and because they are both made of low friction material, the lower end of the container vessel may swing or rotates 360 degrees around the upper hole's vertical center axis caused by centrifugal and centripetal forces applied to beverage container and the lower neck on the container vessel as the vehicle moves.

In one embodiment, a low friction replaceable ring is inserted in the upper hole. In another embodiment, a ball bear ring member is inserted onto the perimeter edge of the upper hole and supports the container vessel's upper member and allows the lower neck to swing from side-to-side and rotate freely.

In one embodiment, the upper section of the lower neck includes an inner ring gripping member that fits around the side walls of a beverage container when placed into the container vessel. The gripping member includes flexible arms that apply a light inward resistant force to the sides of the beverage container that prevents the beverage container from moving inside the container vessel. In another embodiment, the flexible arms are integrally formed on the inside surface of the lower neck on the container vessel.

In another embodiment, at least three lower friction protrusions are located on the outer surface of the upper member that reduce the contact surface areas between the upper member and the perimeter edge of the hole.

In some instances, shorter beverage containers are used with the holder. To accommodate shorter beverage containers, one or more disc-shaped spacers may be placed over the closed end of the lower neck. In one embodiment, the spacers include a downward neck and a recessed upper surface that allows multiple spacers to be stacked together inside the container vessel.

During use, the width and height of a beverage container containing a consumable liquid is determined. If a standard 8 to 20 fl. Oz cylindrical beverage container is used, then the user then determiners the number of spacers needed to elevate the beverage container inside the container vessel so the upper edge of the beverage container is exposed above the container vessel and can be easily grasped to remove the beverage container from the holder. In some instances, the spacer may not be needed and removed.

If a larger beverage container is used, then one of the container vessels is removed from the base and stacked in the adjacent container vessel. The larger container may then be inserted into the upper hole of the base.

Also disclosed herein is another embodiment of the beverage holder designed to be used with the vehicle's existing cup holder. In this embodiment, the base includes a cup holder insert configured to fit into a cylindrical shaped cup holder. The insert extends downward from the bottom surface of the base. Distributed with the beverage holder are optional sleeves that fit around the cup holder insert to allow the cup holder insert to fits tightly inside the cup holder. Also, the beverage holder may be distributed with an optional extension sleeve that elevates the base above the existing console surface to accommodate different center console shapes and configurations and different cup holder depths.

The container vessel used with the base is configured to be inserted into a cup holder is very similar to the container vessel used in the first embodiment and includes half-spherical upper member and a lower neck. The half-spherical upper member may be configured to rest against the perimeter edge formed around the base's hole. Alternatively, the hole may be slightly larger in diameter than the upper member and an inward extending support surface may be formed base. The support surface supports and allows the upper member to slide and allows the lower neck to swing from side-to-side. In the preferred embodiment, the support surface is located inside the base so the top edge of the container vessel's upper member is approximately even with the top edge of the base when the container vessel is inserted into the base.

In all of the embodiments, the upper member is made of low friction material, such as plastic, nylon or metal that allows the upper member to rotate freely in 360 degrees over the perimeter edge of the upper hole. The diameters of the upper hole formed on the base or the opening formed by the support surface formed on the base are sufficient to support the upper member and allow it to smoothly rotate and tilted side to side. When the container vessel is longitudinally aligned over the upper hole, the upper member's transverse mid line axis is substantially aligned with the perimeter edge of the top hole or with the transverse line that extends between the support surface. In both embodiments, the base is configured so the cavity is sufficiently large to allow the lower neck of the container vessel to swing freely side-to-side inside the base.

During use, the vertical orientation of the beverage container inside the container vessel is maintained and automatically adjusted to prevent spills. Because the lower neck is longer than the upper portion, the larger percentage of mass of the beverage container is below the upper section's mid-line axis. This causes the container vessel to slide and tilt from side-to-side relative to the base and maintain its longitudinal axis in vertical alignment as the vehicle is driven.

DESCRIPTION OF THE PREFERRED EMBODIMENT(S)

Figure 1:
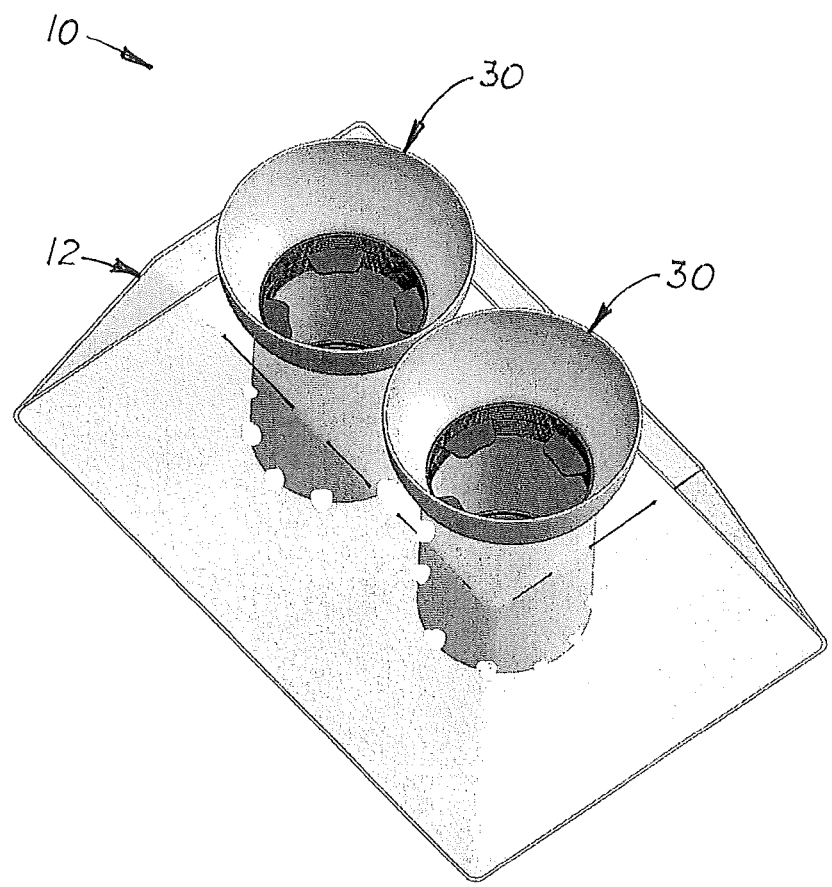
FIG. 1 is a perspective of view of a motor vehicle beverage holder.
Figure 2:
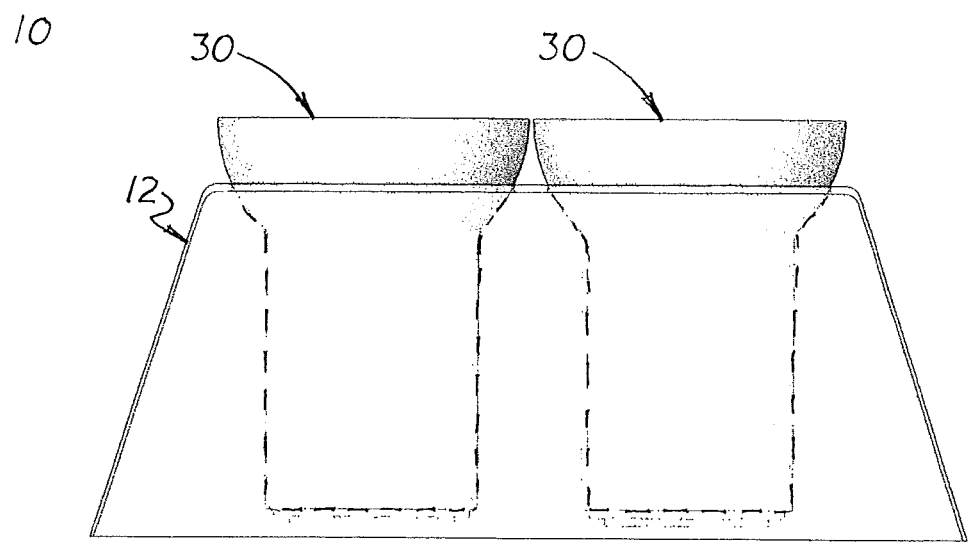
FIG. 2 is a side elevation view of the motor vehicle beverage holder.
Figure 3:
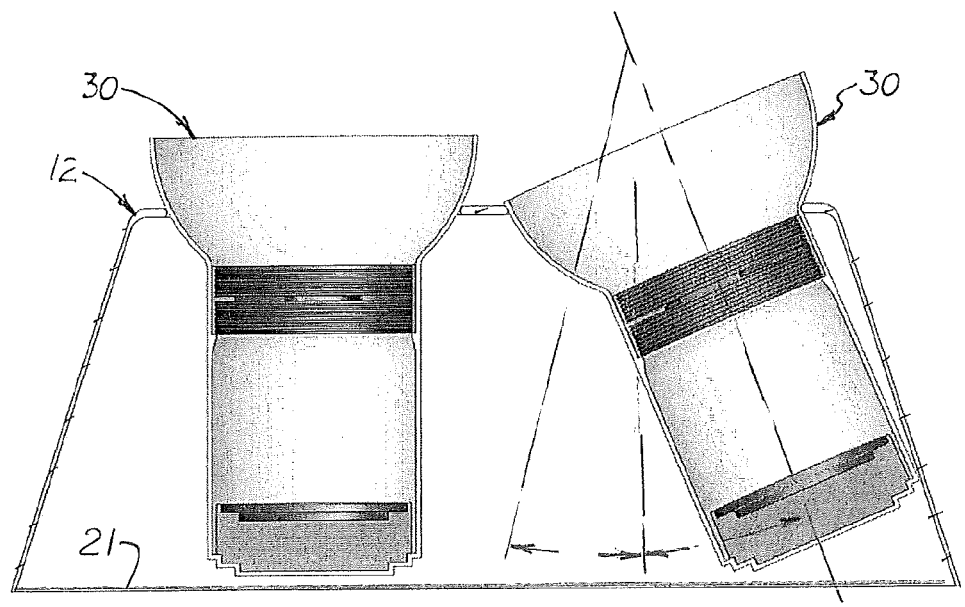
FIG. 3 is a sectional side elevation view of the motor vehicle beverage holder showing a beverage vessel in a rotated position inside a bore formed on the base.
Figure 4:
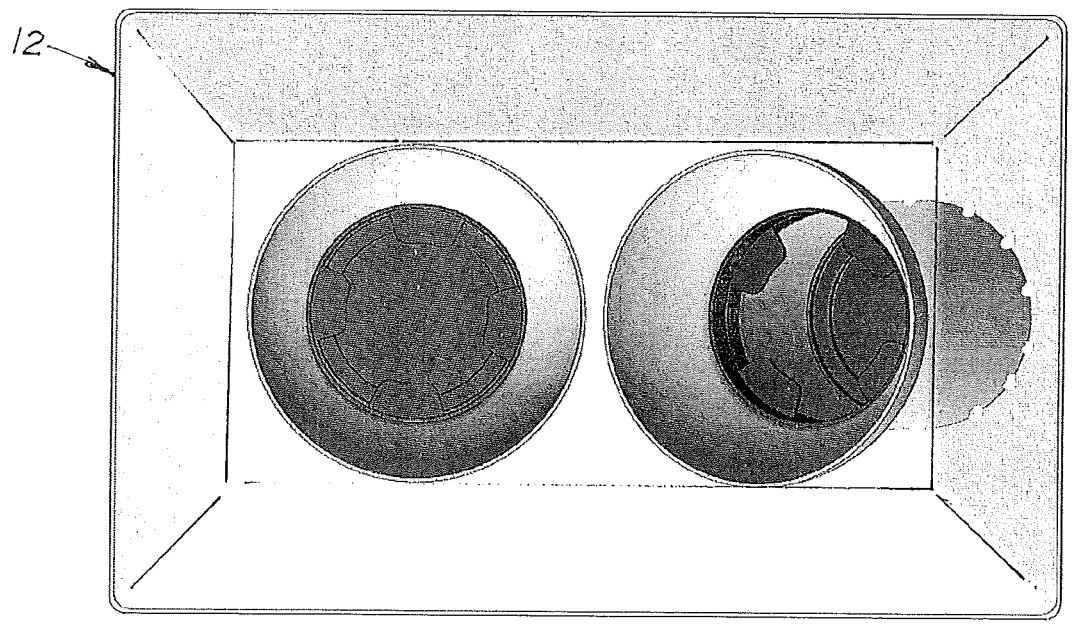
FIG. 4 is a top plan view of the motor vehicle beverage holder shown in FIG. 3.
Figure 5:
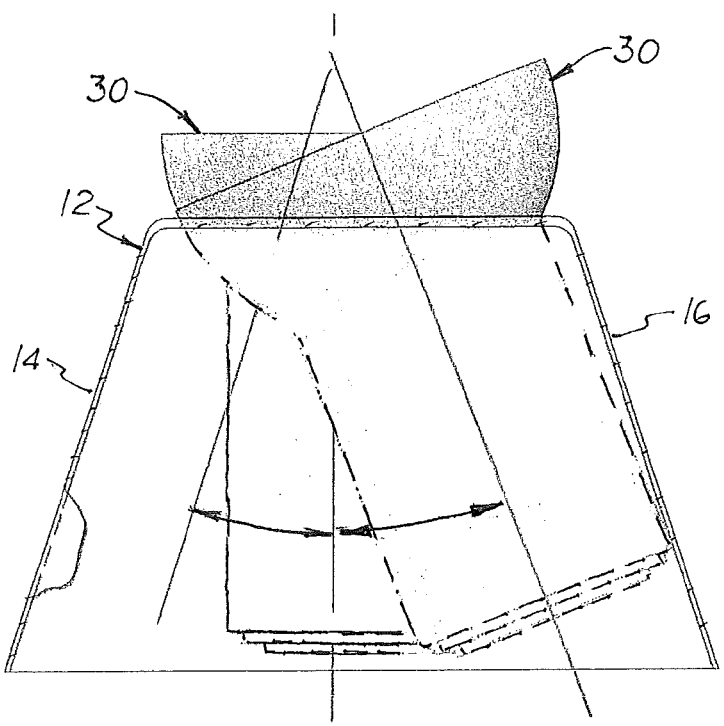
FIG. 5 is an end view of the motor vehicle beverage holder showing the container vessel rotated 45 degrees.

Disclosed is a console beverage holder 10 for a vehicle that temporarily holds a tumbler style beverage container 100 filled with a consumable liquid and automatically adjusts the orientation of the beverage container 100 as the vehicle is moving. The beverage holder 10 is also designed to accommodate a greater range of different sizes of beverage containers, and allows the user to adjust the height of the beverage container 100 when placed in the beverage holder 10 so it may be easily gripped.

The beverage holder 10 includes a base 12 with two side panels 14, 16, two end panels 18, 20, and a top panel 22. The base 12 may include an optional bottom panel 21. Formed on the top panel 22 is at least one upper hole 24 with a thin, smooth inside perimeter edge 25. A large lower cavity 27 is formed inside the base 12.

The beverage holder 10 also includes a beverage container vessel 30 that fits into each upper hole 24. The container vessel 30 is a cup like structure with a half-spherical upper member 36 and a lower neck 44 that extends below the upper hole 24 and into the lower cavity 27 formed inside the base 12. The upper member 36 is made of low friction plastic that allows it to slide and tilted side-to-side freely over the perimeter edge 25. The diameter and side walls of the upper member 36 are larger than the diameter of the upper hole 24 so the wide upper portion of the upper member 36 is positioned above the upper hole 24 and the entire lower neck 44 is positioned below the upper hole 24.

Figure 10:
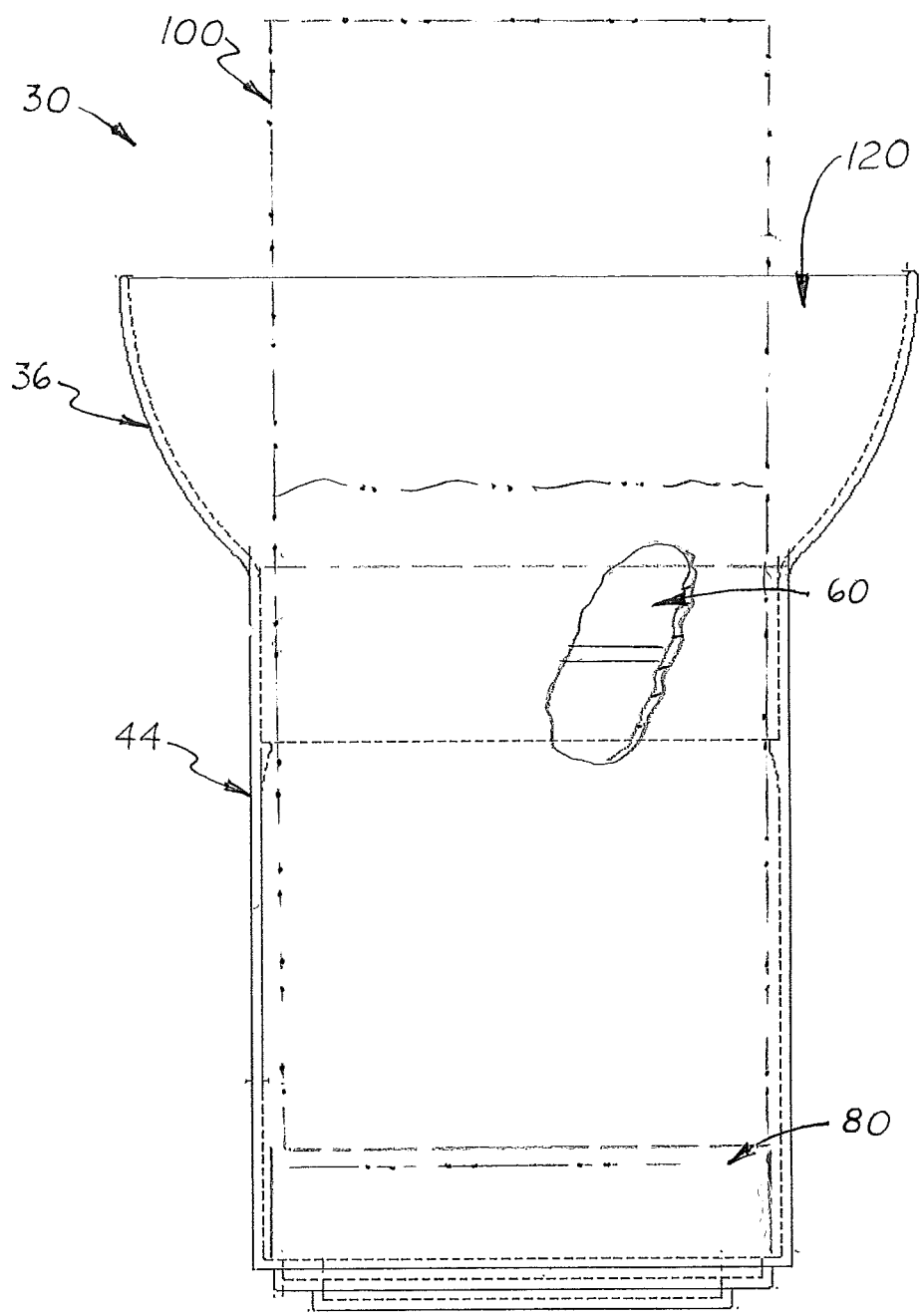
FIG. 10 is a side elevation view of one container vessel.

The lower neck 44 is integrally formed with the upper member 36 and configured to receive a large beverage container 100. As stated above, the lower neck 44 serves as a keel or ballast so the upper member 36 is forced downward and remains in contact with the upper hole 24. The length of the lower neck 44 and the diameter and curvature of the upper member 36 are configured so that when a beverage container 100 is placed into the lower neck 44, a gap 120 is created between the inside surface of the upper member 36 and the outer side walls of the beverage container 100 (see FIG. 10) that allows the side walls of the beverage container 100 to be easily gripped with a pair of fingers and pulled upward.

Figure 11:
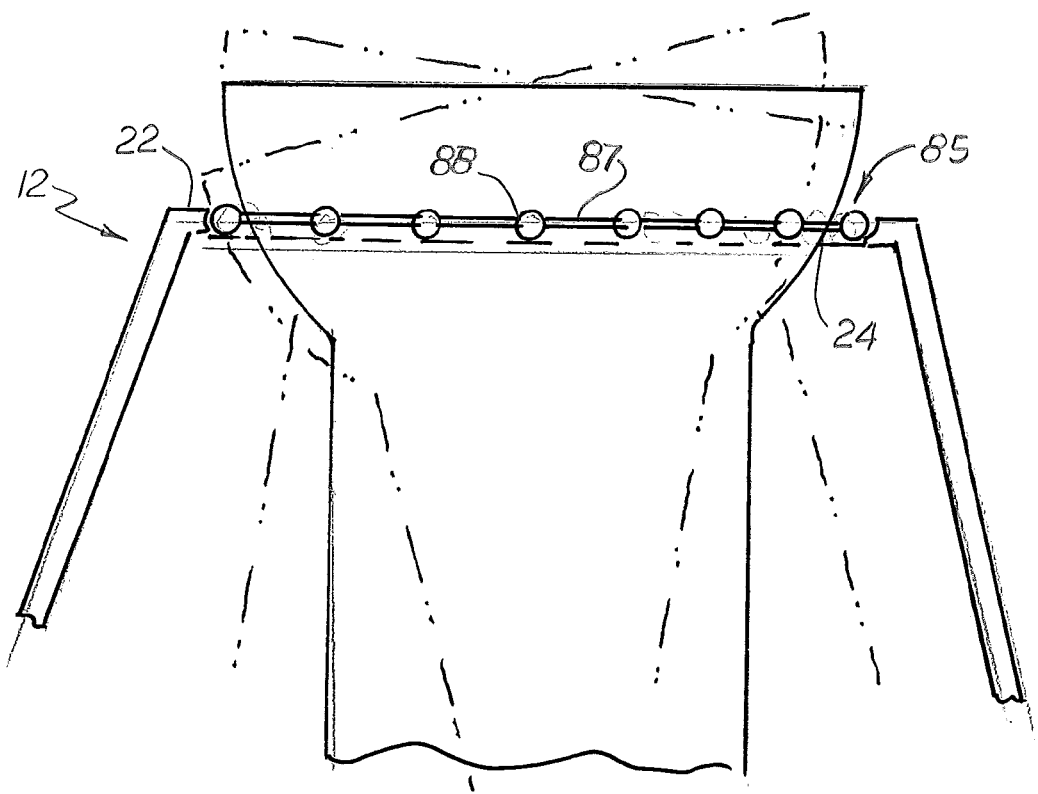
FIG. 11 is a side elevational view of a second embodiment of the invention showing a container vessel placed into the upper hole formed on the base with a ball bearing ring positioned along the perimeter edge of the upper hole that supports the beverage vessel.
Figure 12:
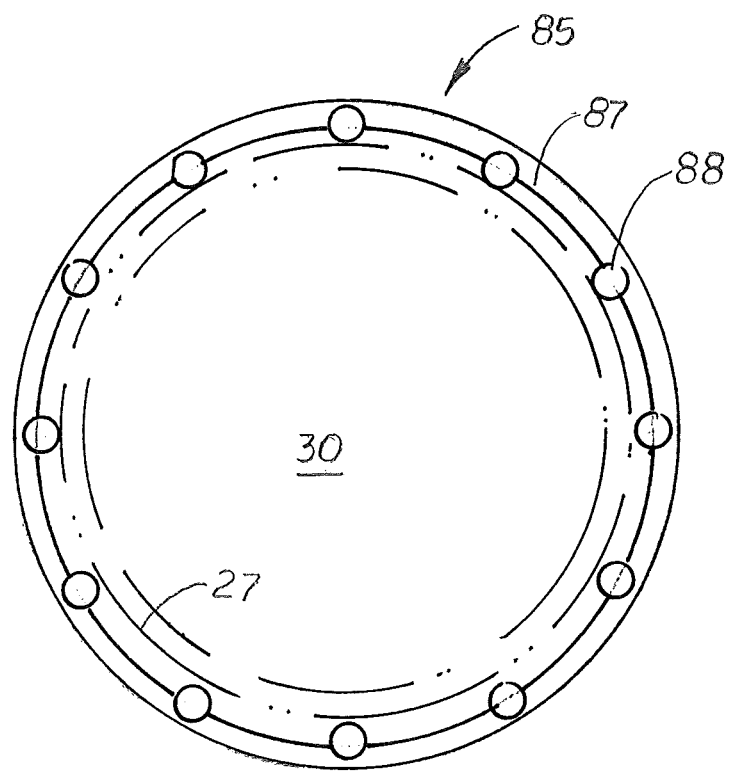
FIG. 12 is a top plan view of the base showing the ball bearing ring located on the perimeter edge of the upper hole.

In another embodiment, shown in FIGS. 11 and 12, a ball bear ring 85 is inserted into the perimeter edge 25 of the hole 24 and supports the container vessel's upper member and allows it to slide and tilt freely. The ball bearing ring 85 includes a ring-shaped race 87 with a plurality of small ball bearings 88 evenly distributed and mounted thereon. The race 87 is mounted on a circular flange surface formed on the base 12 and around the upper hole 24. The ball bearings 88 protrude slightly upward and inward from the race 87 thereby holding the container vessel 30 over the upper hole 24.

Figure 13:
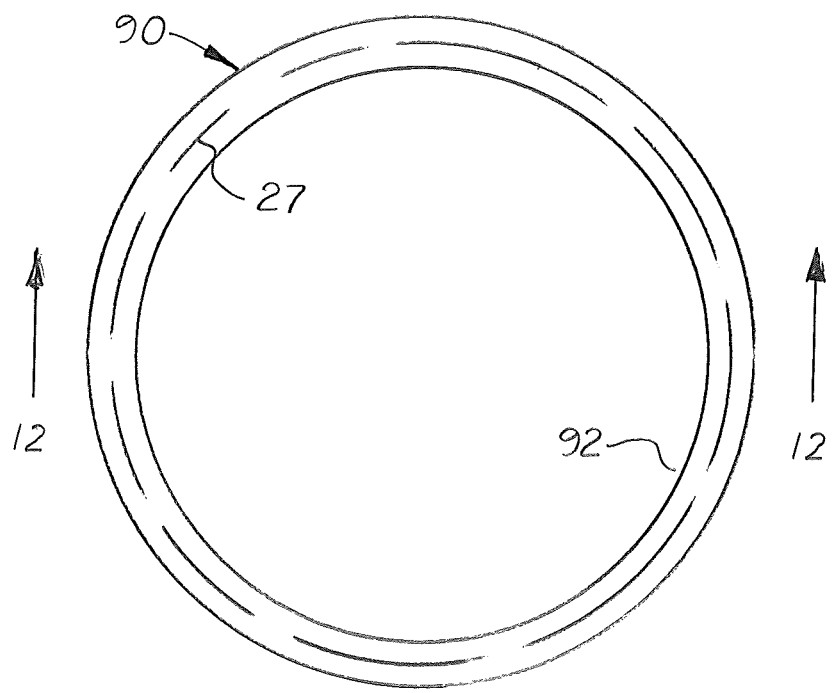
FIG. 13 is a top plan view of the optional replaceable low friction ring.
Figure 14:
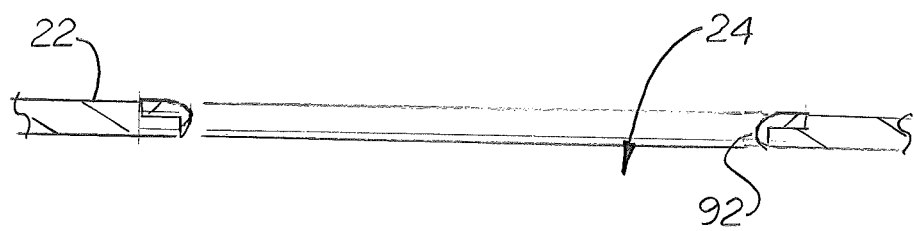
FIG. 14 is a partial side elevational view of top panel of the base with the low friction ring inserted into the upper hole.

FIG. 13 is a top plan view of the optional replaceable low friction ring 90 inserted around the perimeter edge 25 of the upper hole 24. The ring 90 includes a thin, round inward edge 92.

Figure 15:
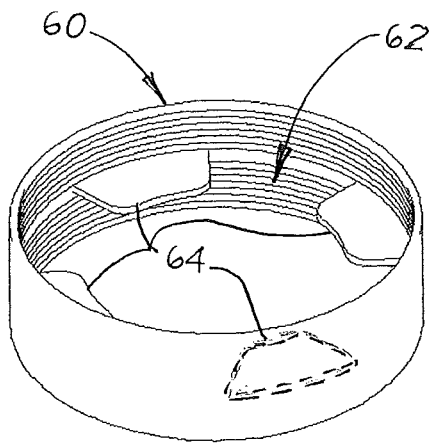
FIG. 15 is a perspective view of the insert gripping member.
Figure 16:
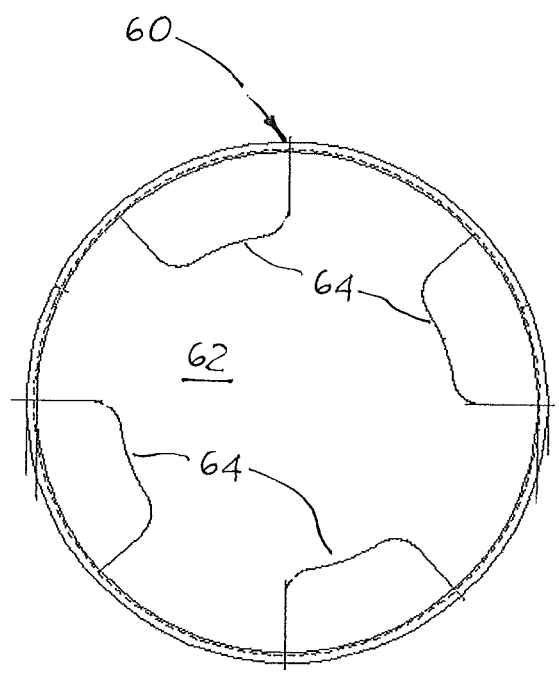
FIG. 16 is a top plan view of the insert gripping member.
Figure 17:
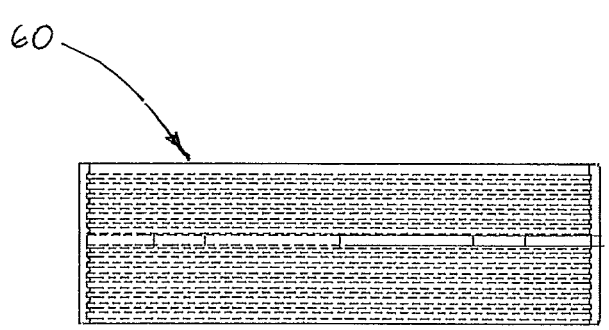
FIG. 17 is a side elevation view of the insert gripping member.

As shown in FIG. 1, located inside the upper section of the lower neck 44 is a ring inner gripping member 60. The gripping member 60 is configured to fit around the side walls of a beverage container 100 when the beverage container 100 is placed into the container vessel 30. As shown more clearly in FIGS. 15-17, the gripping member 60 includes a center opening 62 with a plurality of inward extending flexible arms 64 that extend into the center opening 62 and that apply light inward resistant opposing forces to the sides of the beverage container 100 to keep the beverage container 100 co-axially aligned inside the lower neck 44.

Figure 9:
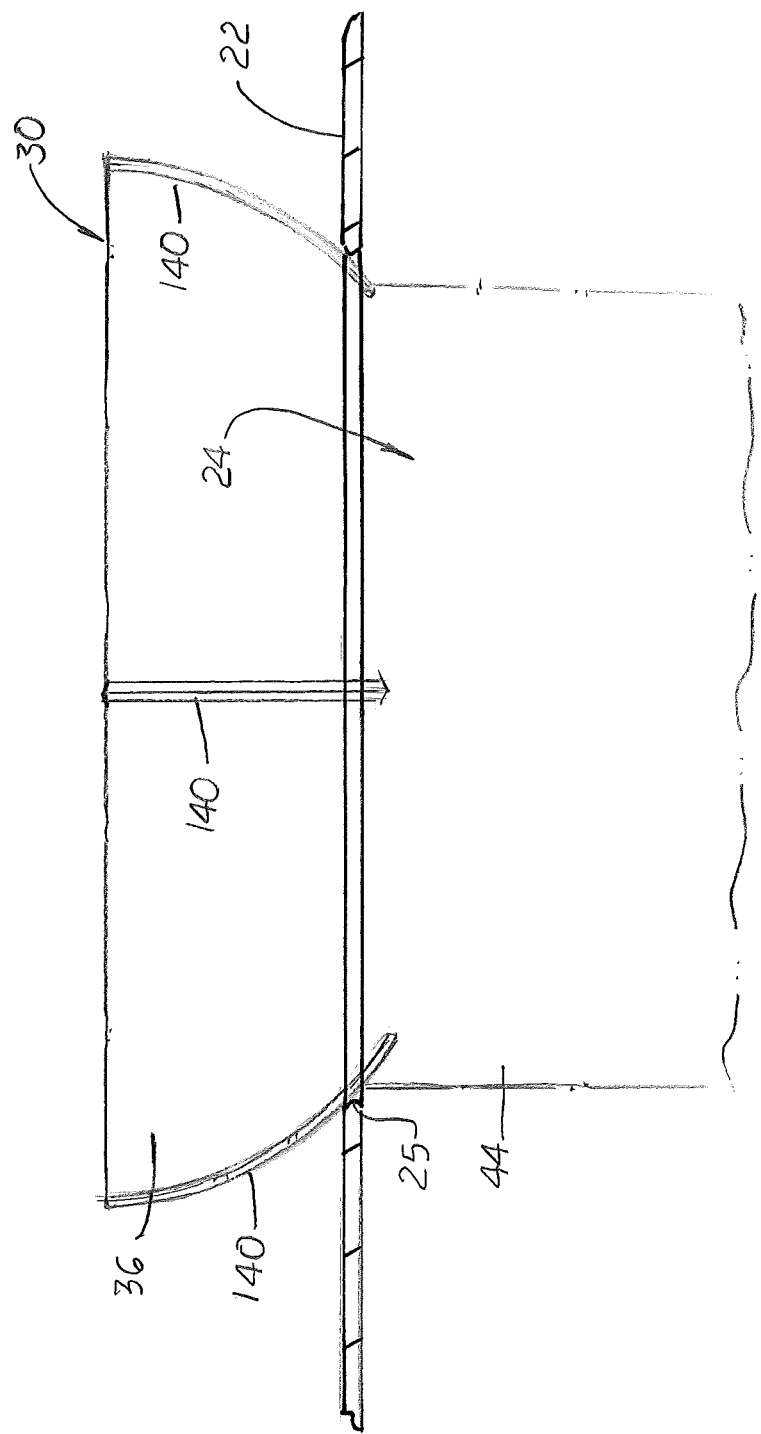
FIG. 9 is a partial sectional view of the base showing the thin, round perimeter edge surrounding the upper hole and showing the upper member of a container vessel with lower friction protruding ridges formed on the outer surface of the upper member.

As shown in FIG. 9, at least three lower friction protrusions 140 are formed on the outer surface of the upper member 36 that reduce the contact surface areas between the upper member 36 and the perimeter edge 25 of the upper hole 24.

As shown in FIGS. 10, and 19-21, located on the closed end of the lower neck 44 are one or more disc-shaped spacers 80 that the user uses to adjust the height of the upper edge of the beverage container 100 when placed into the container vessel 30. The spacers 80 include two upper recessed spaces 82, 84 and two downward extending necks 88, 90. During used, two or more spacers 80 may be stacked inside the lower neck 44 by inserting the necks 88, 90 on an upper spacer 80 into the spaces 82, 84 on a lower spacer 80. The spaces 82, 84 are also configured to receive the lower end of a beverage container 100 to hold the beverage container 100 inside the into the container vessel 30.

Figure 18:
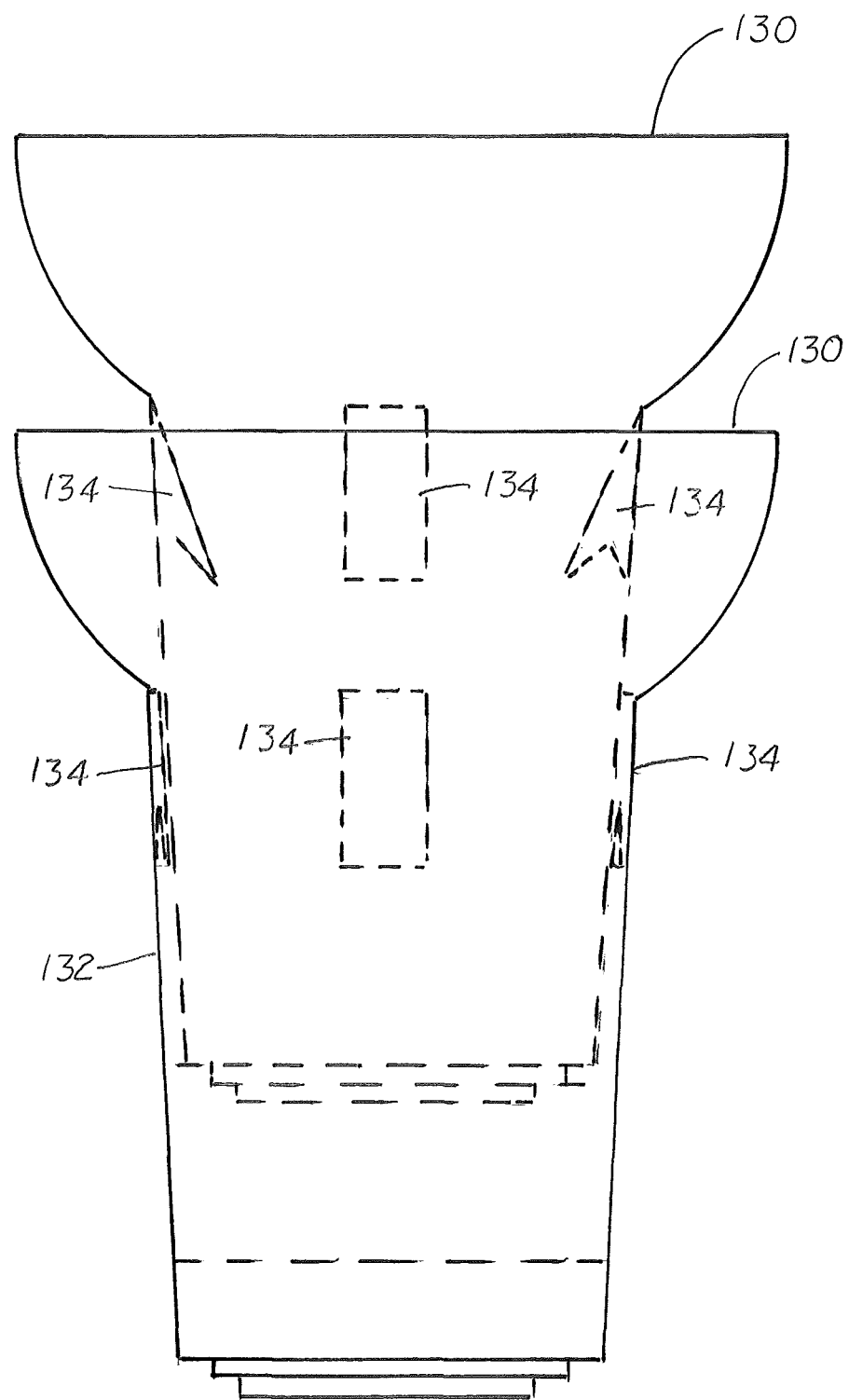
FIG. 18 is a second embodiment of two stacked container vessels with diagonally aligned side walls and with integrally formed flexible arms.
Figure 19:
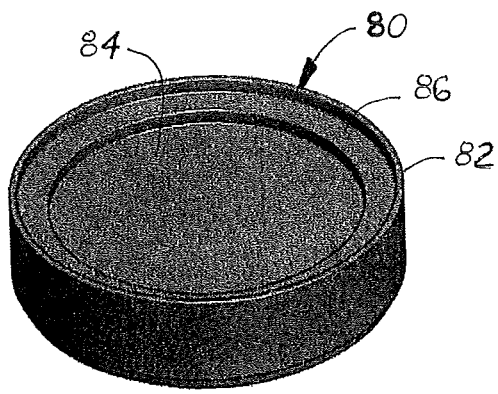
FIG. 19 is a perspective view of a spacer.
Figure 20:
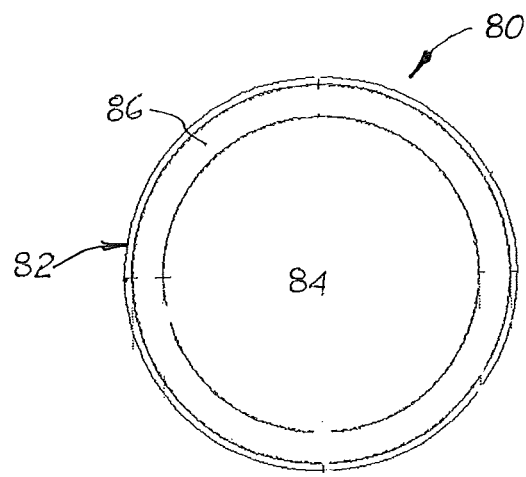
FIG. 20 is a top plan view of a spacer.
Figure 21:
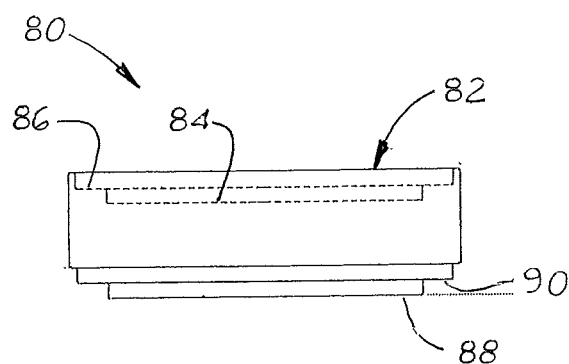
FIG. 21 is a side elevation view a spacer.
Figure 22:
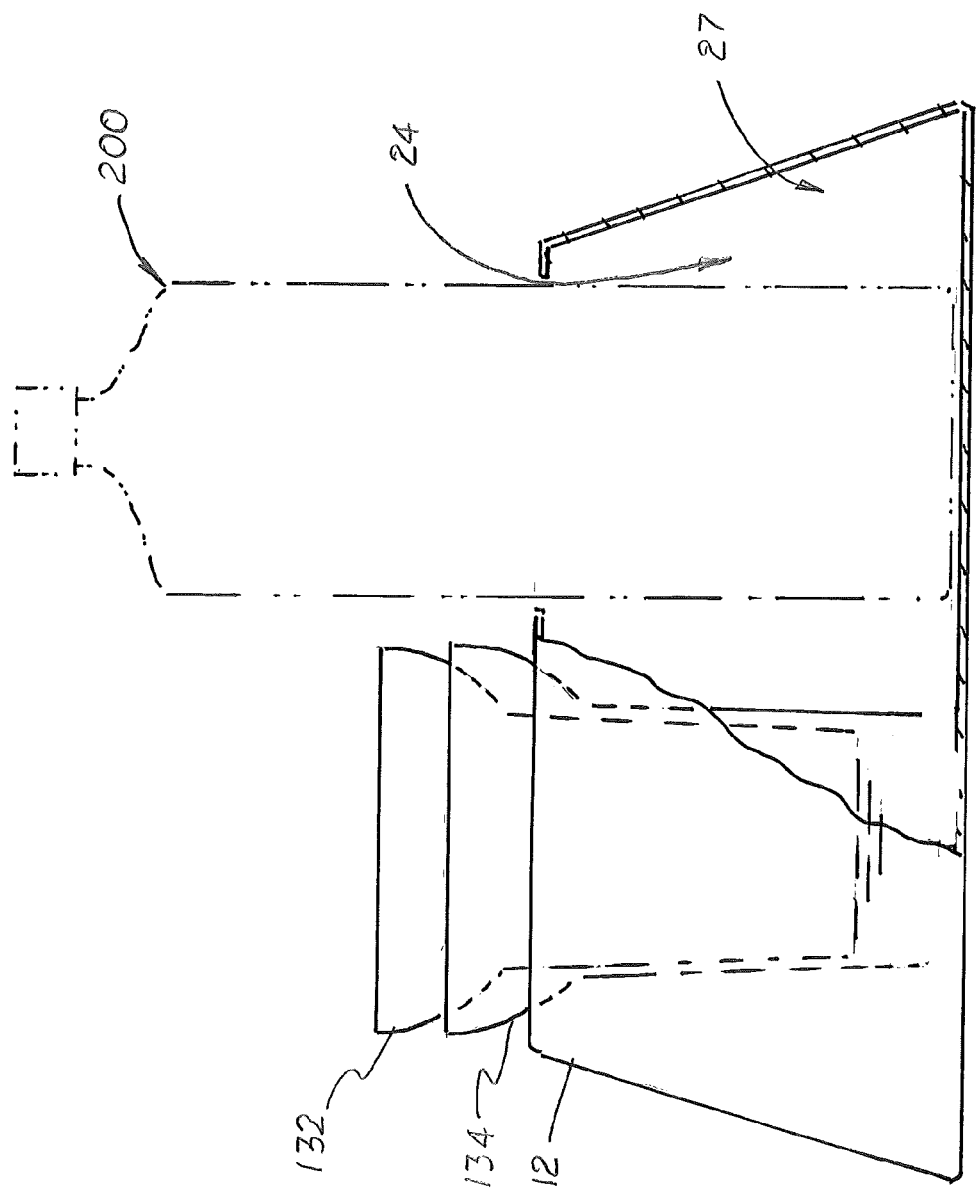
FIG. 22 is a perspective view of the motor vehicle beverage holder assembled by a manufacturer into a motor vehicle.

FIG. 18 is a second embodiment of two stacked container vessels 130 with lower necks that have diagonally aligned side walls 132. Formed inside the lower necks are integrally formed flexible arms 134.

Figure 23:
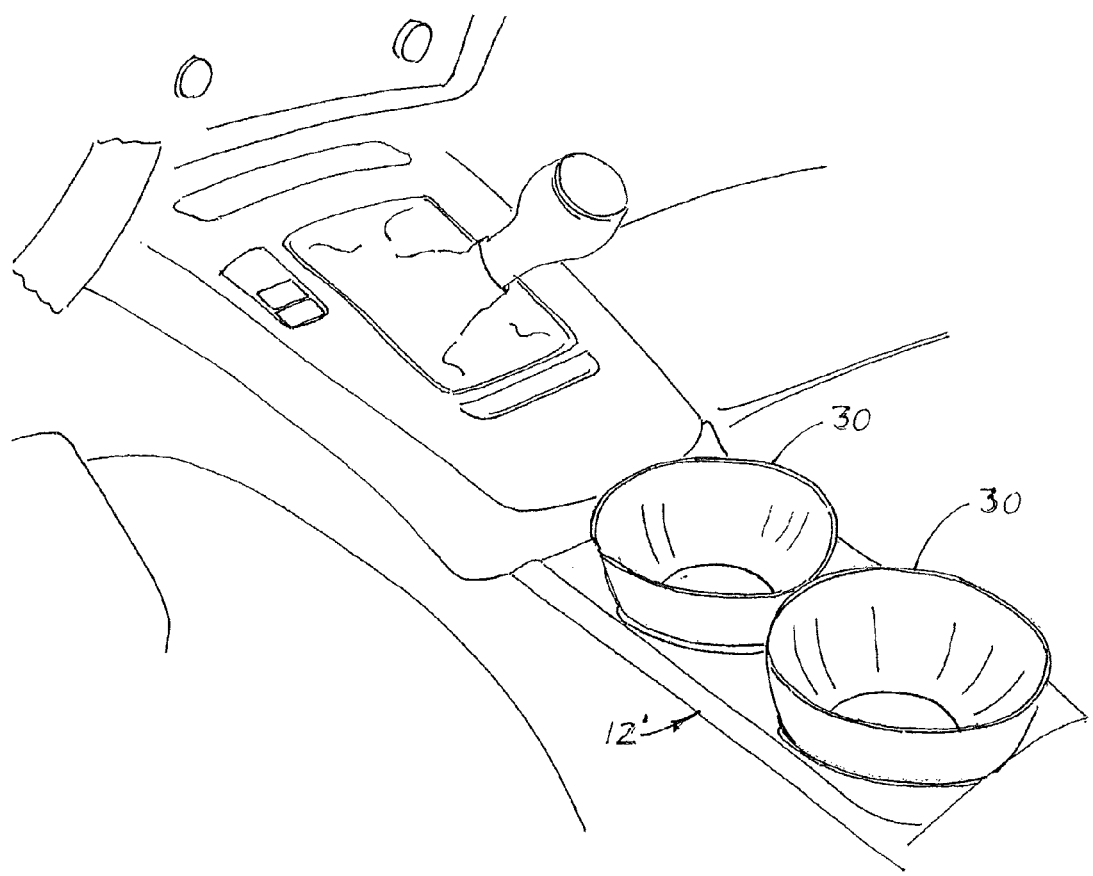
FIG. 23 is a partial sectional, side elevational view of the beverage holder holding a large 64 fl. oz plastic container with the two container vessels stacked together.

It should be understood that the holder 10 may be manufactured and sold either as an 'aftermarket product' that is installed by the motor vehicle owner or it may be manufactured and installed by the motor vehicle manufacturer and incorporated into the center console as shown in FIG. 23.

FIG. 23 is a partial sectional, side elevational view of the beverage holder holding a large 64 fl. oz plastic container 200 with the two container vessels 132, 132' stacked together.

Figure 24:
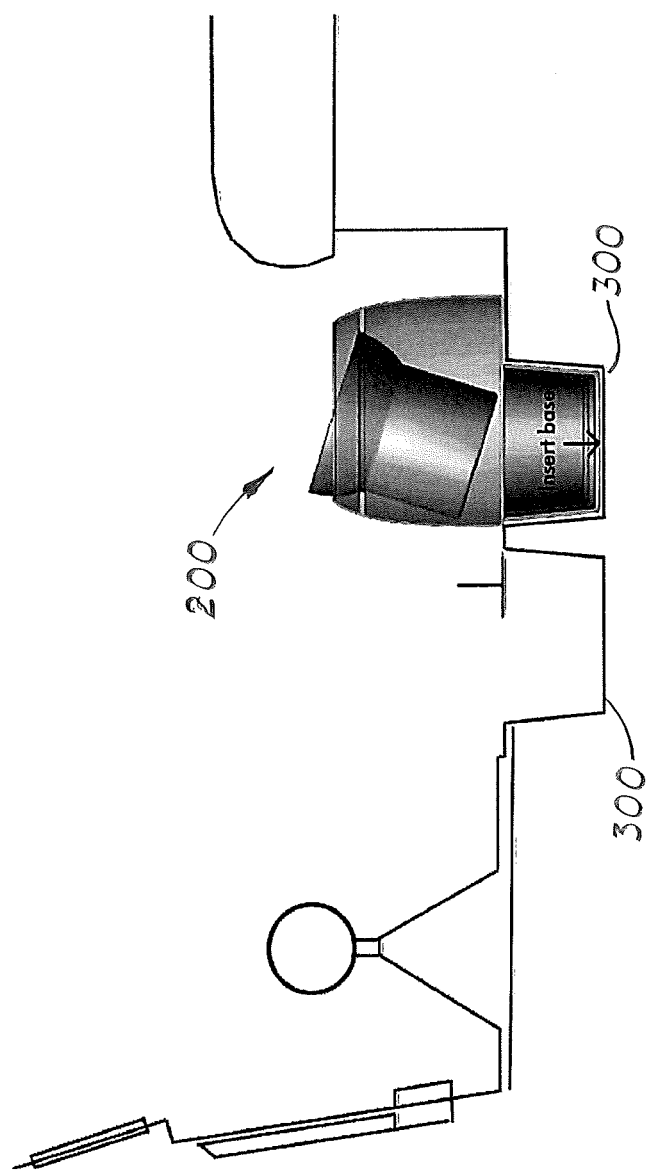
FIG. 24 is an illustration showing the center console area between the two front seats in a motor vehicle showing an another embodiment of the beverage holder placed inside a cup hold.
Figure 25:
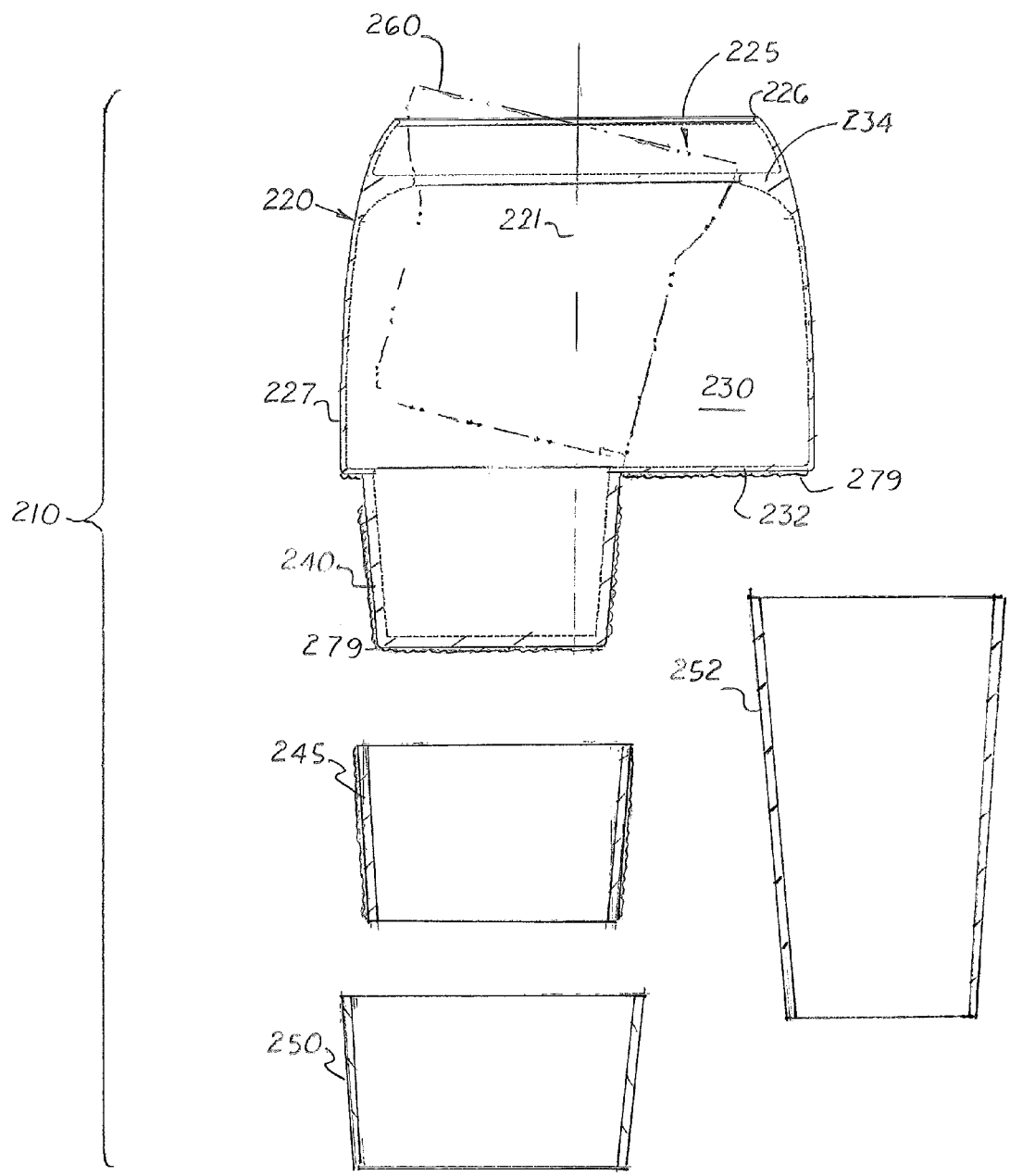
FIG. 25 is a sectional side elevational view of the second embodiment of the beverage holder shown in FIG. 24 shown distributed as a kit with three optional sleeve adapters.
Figure 26:
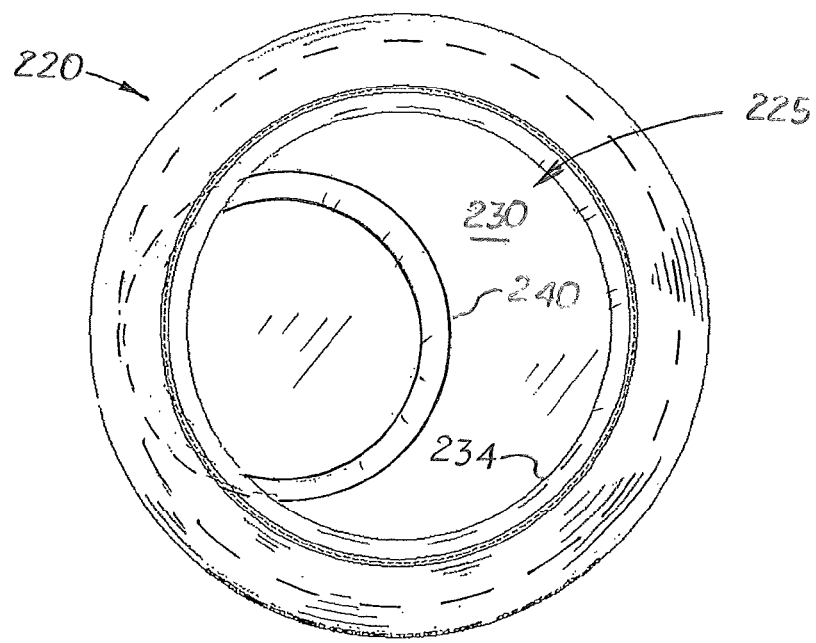
FIG. 26 is a top plan view of the base used in the beverage holder shown in FIGS. 24 and 25.
Figure 27:
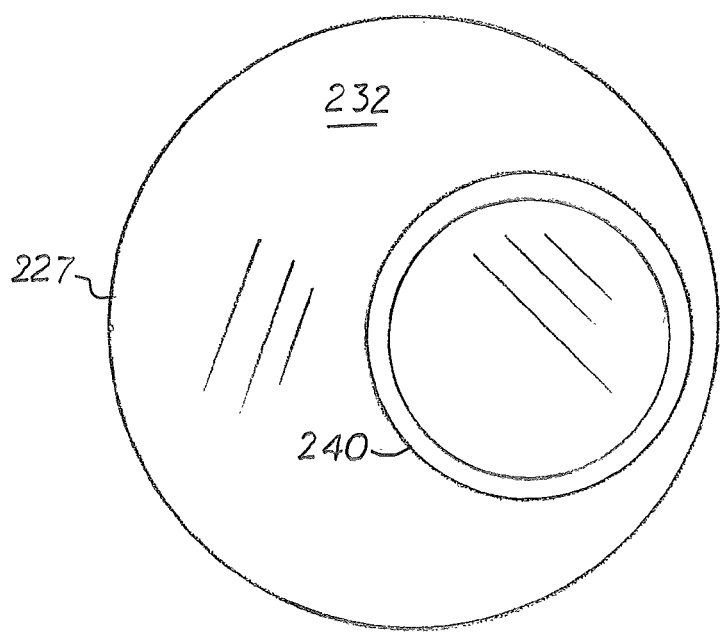
FIG. 27 is a bottom plan view of the base used in the beverage holder shown in FIGS. 24-26.
Figure 28:
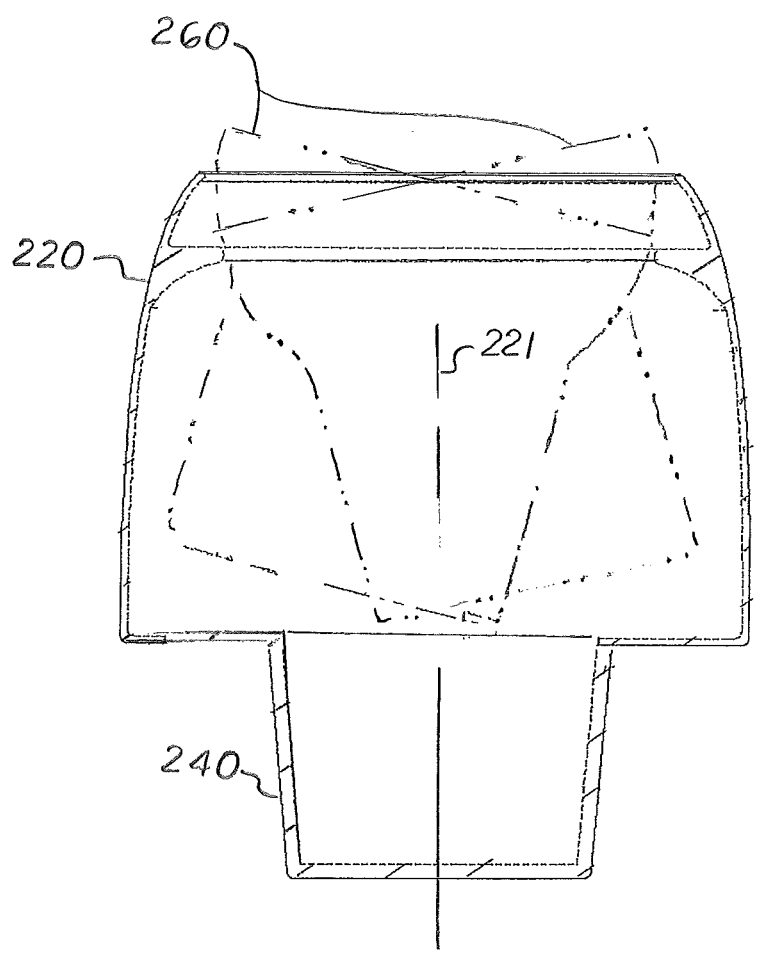
FIG. 28 is a sectional side elevational view of the base showing container vessel inserted into the base and supported by a circular support ring formed inside the base.

Also shown in FIGS. 24—disclosed herein is another embodiment of the beverage holder 200 designed to be used with a vehicle's existing cup holder 300. In this embodiment, the beverage holder 200 includes a hollow base 220 with a cup holder insert 240 configured to fit into a cylindrical shaped cup holder 300. The insert 240 extends downward from the bottom surface 232 of the base 220. In the embodiment shown in FIGS. 24-27, the insert 240 is offset from the base's midline axis 221. As shown in FIG. 28, the insert 240 may be coaxially aligned on the base 220.

In the preferred embodiment, the insert 240 is integrally formed on the base 220. It should be understood, however, that the insert 240 may be removable and selectively attached to the base 220 via threads or snap connectors with compatible threads or slots formed on the base 220, (not shown).

The base 220 may be distributed as a kit 210 with optional sleeves 245, 250 that fit around the cup holder insert 240 to allow the cup holder insert 240 to fits tightly inside the cup holder 300. The first sleeve 240 is slightly smaller in diameter than the second sleeve 250 thereby enabling the second sleeve 250 to be placed around the first sleeve 240 when attached to the insert 240 to create a snug fit between the insert 240 and the cup holder 300. The kit 210 may also include an optional extension sleeve 252 that fits around the insert 240 and elevates the base 220 above the existing center console with an irregular shape or that includes elevated objects, such as an arm rest, that prevents the base 220 from being inserted directly into the cup holder 300. The first sleeve 240 and second sleeves 250 may be attached to the end of the extension sleeve 252 to create a snug fit between the insert 252 and the cup holder 300.

An optional high friction layer 279 may be added to the bottom surface 232 of the base 220 and to the outside surfaces of the insert 240 and the first sleeve 245

Figure 6:
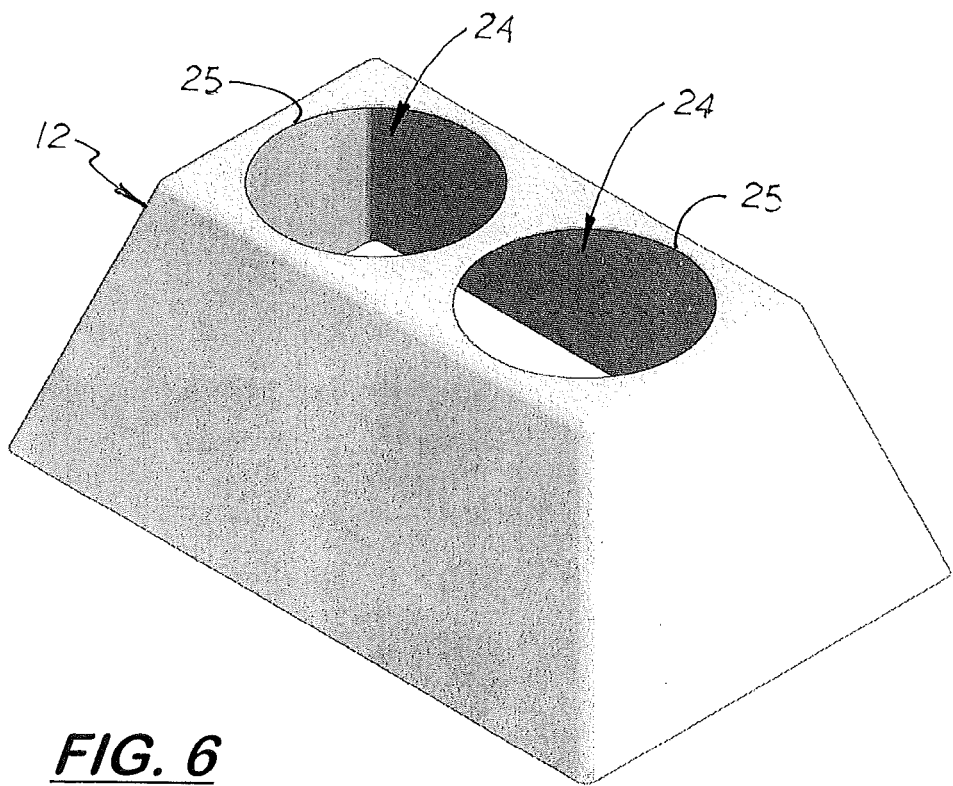
FIG. 6 is a perspective of view of the base with the container vessels removed.
Figure 7:
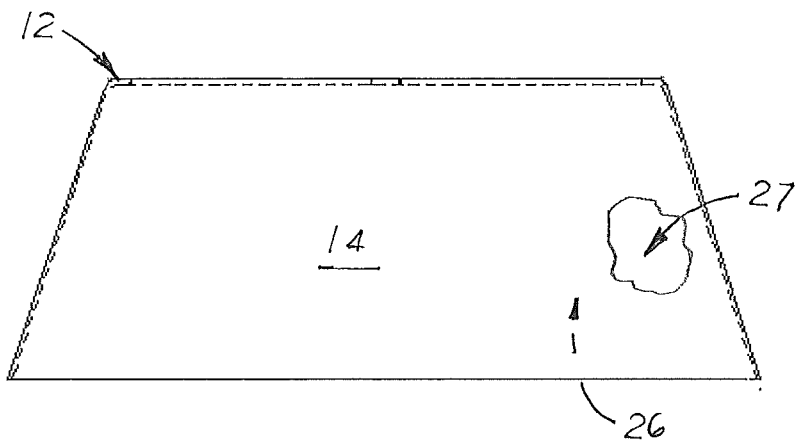
FIG. 7 is a side elevation view of the base.
Figure 8:
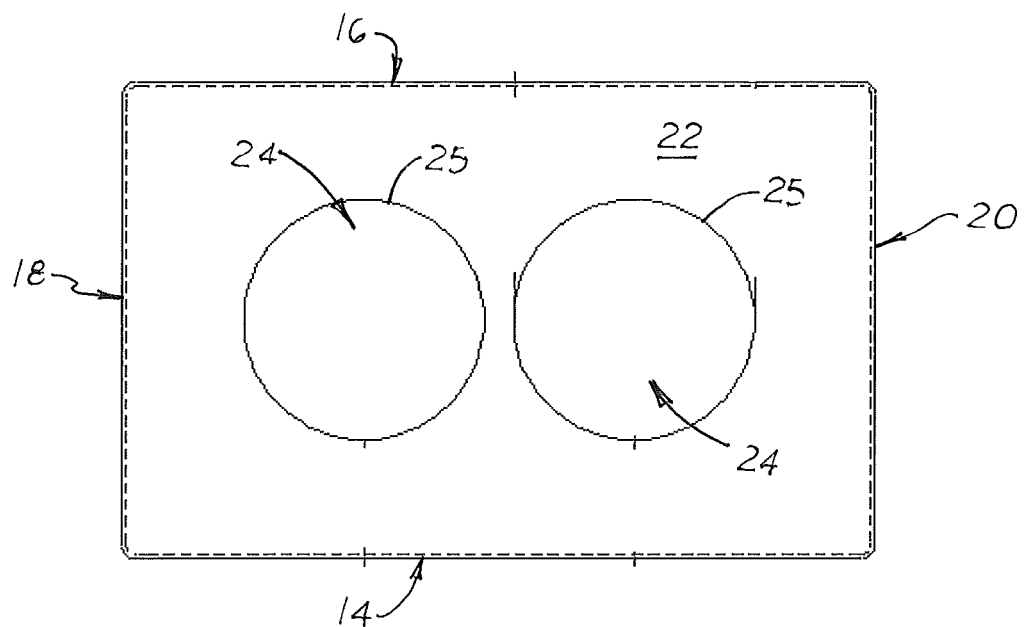
FIG. 8 is a top plan view of the base.

The container vessel 260 used with the base 220 configured to be inserted into a cup holder 300 is very similar to the container vessel 30 used in the first embodiment and includes half-spherical upper member 262 and a lower neck 265. The half-spherical upper member 262 may be configured to rest against the perimeter edge 226 formed around the base's upper hole 225 similar to the way the container vessel 30 rests against the perimeter edge 25 of base 12 shown in FIG. 6. In the embodiment, the hole 225 is slightly larger in diameter than the diameter of the upper member 262 and an inward extending support surface 234 may be formed base 220 has shown in FIGS. 25, 26, and 28. The support surface 234 supports and allows the upper member 260 to rotate, slide, and tilt from side-to-side. In the preferred embodiment, the support surface 234 is ring structure slightly smaller than the hole 225 and slightly smaller in diameter than the upper member 260 and slightly larger in diameter than the upper member at its mid-line, transverse axis 263. The location of the support surface 234 inside the base 220 is sufficient so that the top edge 261 of the container vessel's upper member 262 is approximately even with or slight below the perimeter edge 226 of the base 220 when the container vessel 260 is inserted into the base 220.

Figure 29:
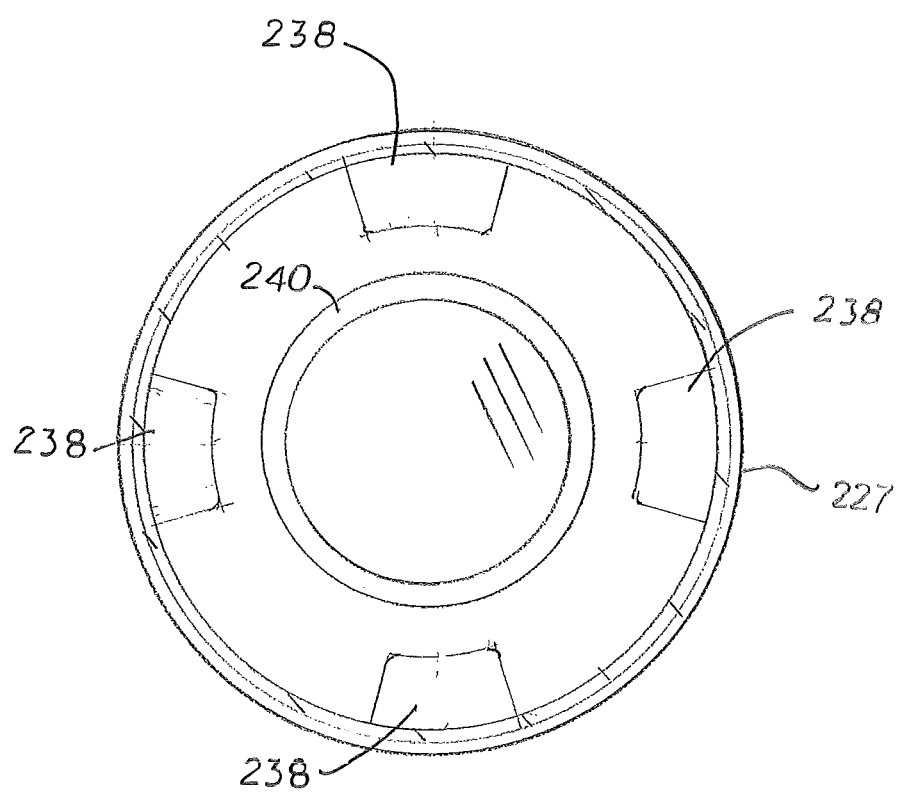
FIG. 29 is a top plan view of an alternative support surface with four inward lugs used to support the container vessel.

FIG. 29 is a top plan view of an alternative support surface comprising four rigid, inward extending lugs 238 formed the inside surface of the base 220 used to support the upper member 262 on the container vessel 260.

Figure 30:
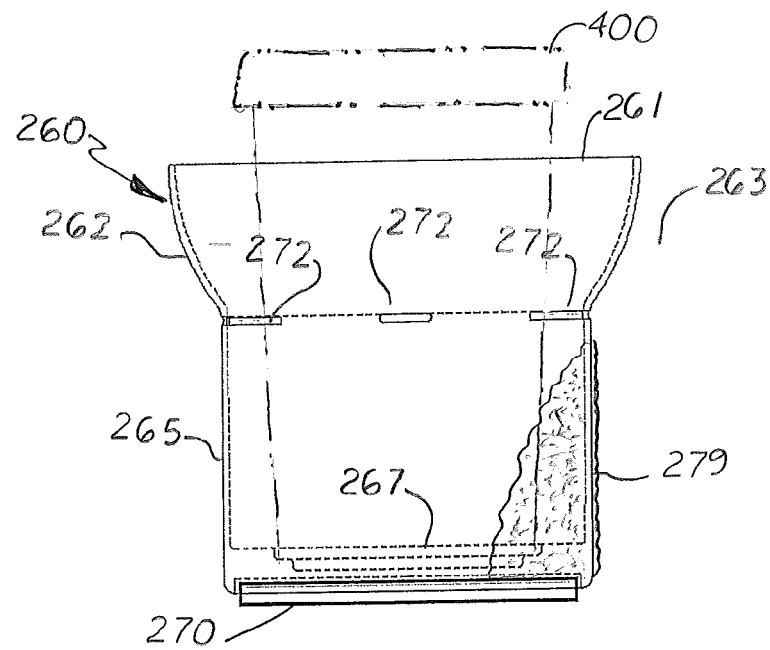
FIG. 30 is a side elevational view of the container vessel.
Figure 31:
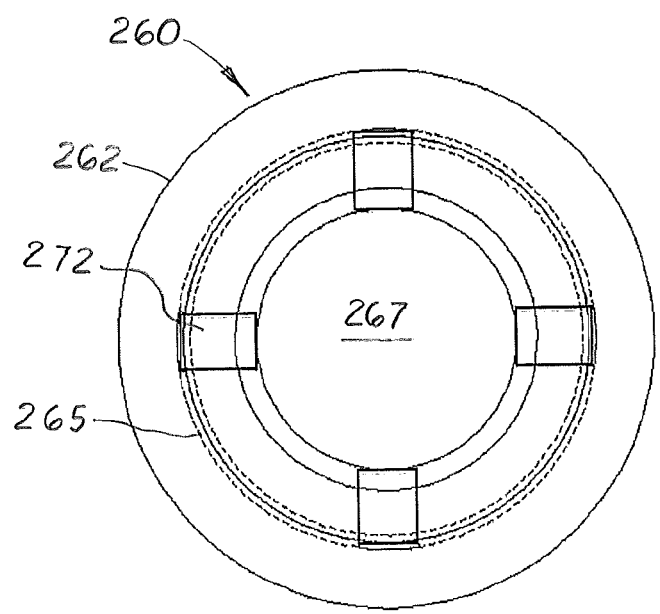
FIG. 31 is a top plan view of the container vessel shown in FIG. 30.

As shown in FIGS. 30-31, the container vessel 260 may include two or more coaxially aligned circular steps 267 formed on the bottom surface that are designed to receive the lower edge of a beverage cup 400. Also four flexible leaves 272 may be attached to the inside surface of the container vessel 269 used to exert an inward directed biasing force against the side wall of a beverage cup 400 placed inside the container vessel 260. Also attached to the end of the neck 265 is a weight disc 270 which lowers the container vessel's center of gravity inside the base 220.

In both embodiments shown in the Figs, the bases 12, 220 have thin (⅛ inch) side walls and made of smooth, low friction plastic. The base 12 measures approximately 13 to 15 inches in length and 5 to 8 inches in width and 7 to 9 inches in height. Each upper hole 24 measures approximately 4.5 inches in diameter. When two holes 24 are used, the center of the upper holes 24 are approximately 5 inches apart. The top panel 22 of the base 12 is approximately $⅛^{th}$ thin and the perimeter edge 25 is round.

In the first embodiment, the overall length of each container vessel 30 is 6.5 in length. The upper edge and the diameter of the upper member 36 is approximately 5 inches. The height of the upper member 36 is approximately 2 inches. The outside diameter of the lower neck 44 is 3.375 inches. The inside diameter of the inner bore is approximately 3.25 inches. The length of the lower neck 44 is approximately 4.5 inches.

In the second embodiment, the base 220 measures 5-12 inches in diameter near its bottom surface and approximately 4¼ inches in diameter along its top edge. The base 220 is approximately 4 inches in height. The insert 240 is conical with a top diameter 3¼ inches in diameter, a lower diameter 3 inches in diameter, and a length approximately 2 inches. The upper diameter of the upper member 262 on the container vessel 260 is approximately 3⅞ inches in diameter. The overall height of the container vessel 260 is approximately 3¾ inches and the length of the neck 265 is 2¼ inches in length. The neck 265 is cylindrical and has a diameter of approximately 3⅛. The weight disc 270 is located on the bottom of the neck 265 and weights 4 to 12 oz.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A beverage holder between two seats of a vehicle, comprising:
    a. a base located between seats in a vehicle, said base includes a top surface with an upper hole formed thereon, said upper hole includes a perimeter edge and a cavity formed inside said base; and;
    b. a beverage container vessel that includes a downward extending, half- spherical, hollow upper member and lower neck with a center bore configured to receive a beverage container filled with a consumable liquid, said lower neck extends downward from said upper member, said upper member is larger in diameter than said upper hole and configured to slide, axially rotate in 360 degrees and tilt from side-to-side while being continuously supported by said perimeter edge, said lower neck includes a closed end and is smaller in diameter than said upper hole and configured to move freely inside said cavity formed on said base; and,
    c. at least one removable spacer disc disposed inside said center bore and against said closed end of said lower neck.

2. The holder, as recited in claim 1, wherein said lower neck on said beverage container vessel is cylindrical.

3. The beverage holder, as recited in claim 1 further including a ring with a plurality of ball bearings disposed to said perimeter edge of said upper hole.

4. The beverage holder, as recited in claim 1, further included an insert ring disposed inside said upper hole.

5. A beverage holder for a vehicle with a cylindrical cup holder, comprising:
    a. a beverage container vessel that includes a downward extending, half-spherical, hollow upper member and a lower neck with a center bore that extends downward from said upper member; and, b. a hollow base with top surface with an upper hole that forms a support surface formed neck on said beverage container vessel, said base also includes a bottom surface with a perpendicularly aligned cup holder insert extending downward therefrom, said cup holder insert configured to fit into said cup holder and support said base vertically above said cup holder.

6. The beverage holder as recited in claim 5, wherein said base includes a midline axis and said cup holder insert is axially offset from said midline axis.

7. The beverage holder, as recited in claim 6, wherein said support surface includes an inward extending ring formed on the inside surface of said base.

8. The beverage holder, as recited in claim 7, further including at least one sleeve that fits over said insert.

9. The beverage holder, as recited in claim 8, further including a high friction coating attached to said insert.

10. The beverage holder, as recited in claim 7, wherein said insert is integrally formed on said base.

11. The beverage holder, as recited in claim 5, wherein said insert is coaxially aligned with said base.

12. The beverage holder, as recited in claim 11, wherein said support surface is an inward extending ring formed on the inside surface of said base.

13. The beverage holder, as recited in claim 5, wherein said beverage container vessel includes two or more coaxially aligned steps.

14. The beverage holder, as recited in claim 5, further including a weight attached to said beverage container vessel.

* * * * *